United States Patent [19]

Kühnlein et al.

[11] 3,724,778

[45] Apr. 3, 1973

[54] OPERATING APPARATUS FOR A CARTRIDGE TAPE RECORDER

[75] Inventors: Dieter Kühnlein, Nurnberg; Reinhold Emmert, Furth/Bayern; Georg Haag, Nurnberg, all of Germany

[73] Assignee: Grundig E.M.V. Elektro-Mechanische Versuchsanstalt Max Grundig, Furth-Bayern, Germany

[22] Filed: Sept. 13, 1971

[21] Appl. No.: 179,981

[30] Foreign Application Priority Data

Sept. 12, 1970 Germany....................P 20 45 230.6

[52] U.S. Cl. ..................................242/198, 274/4 E
[51] Int. Cl. .....G03b 1/04, G11b 15/32, G11b 23/04
[58] Field of Search ..............................242/197–200; 274/4 C, 4 F, 11 C; 179/100.2 Z

[56] References Cited

UNITED STATES PATENTS 3,395,871 8/1968 Ackermann et al. ..................242/198
3,578,261 5/1971 Yamamoto et al. ..................242/199
3,656,704 4/1972 Ogura ..................................242/198

*Primary Examiner*—Leonard D. Christian
*Attorney*—Michael S. Striker

[57] ABSTRACT

The carrier of the operating means for a tape cartridge, is mounted for rectilinear movement between an inoperative position and an operative position in which the operating means are inserted into the cartridge for operating the tape. Double armed lever means support at one end the carrier, and are at the other end loaded by a weight so that the carrier and the operating means thereon, are counter-balanced and can be moved by a small force to and from the operative position.

12 Claims, 9 Drawing Figures

OPERATING APPARATUS FOR A CARTRIDGE TAPE RECORDER

BACKGROUND OF THE INVENTION

The present invention relates to a tape recorder employing a closed cartridge which is inserted into the housing of the tape recorder through a slot, and cooperates with the operating means on a carrier which can be raised and lowered. Cartridge tape recorders of this type are particularly used for automobiles. The operating means on the carrier include in addition to a flywheel with the drive shaft, two slip clutches for the winding of the tape, and brakes, intermediate gears, and the like.

A cartridge tape recorder with a carrier guided in a parallelogram linkage is disclosed in the French Pat. No. 1,466,806. The weight of the carrier is balanced by springs.

Another cartridge tape recorder with a pivotally mounted carrier for the operating means is disclosed in the German GM 1,933,841. Since periodic oscillations and jerks occur in vertical direction in a moving automobile, the cartridge must be braced with great force against its support in order to avoid relative movements between the drive shaft mounted on the movable carrier, and the cartridge which is supported on the frame. The bracing force must be produced by the starting key whenever the tap recorder is started.

The Austrian Pat. No. 267,214 discloses a cartridge tape recorder provided with a insertion slot for the cartridge, whose height can be adjusted, and in which the inserted cartridge must be manually pressed down into engagement with stationarily mounted operating means. This arrangement requires a great deal of space which is otherwise used for a radio set connected with the tape recorder.

SUMMARY OF THE INVENTION

It is one object of the invention to overcome the disadvantages of cartridge tape recorders according to the prior art, and provide a simple apparatus reducing the sensitivity of a cartridge tape recorder against vibrations and jerks.

A related object of the invention is to provide a cartridge tape recorder which reliably operates in a moving vehicle irrespective of the condition of the road surface.

With these objects in view, the present invention provides counterbalancing means for counterbalancing by a weight means, the combined weight of the carrier and the operating means on the same. In accordance with the preferred embodiment of the invention, the counterbalancing means include lever means having one end connected with the carrier means, and the other end supporting a weight means. Pivot means are provided between the ends of the lever means for supporting the same on a supporting frame, and the mounting means which mount the carrier for movement between an inoperative and an operative position, preferably mount the carrier for rectilinear movement toward and away from a cartridge inserted into the tape recorder and supported on a supporting frame of the same.

Due to the fact that the carrier with the operating means is counterbalanced substantially in a condition of equilibrium, the apparatus has low sensitivity against shortly acting undesired displacement forces, and consequently operates more reliably. The manual control is facilitated, since due to the fact that the carrier is counterbalanced substantially in a position of equilibrium, no substantial resilient pressure between the carrier and the cartridge is required. Only small resilient forces are produced by springs acting on the lever means for overcoming the friction of the lever means at the supporting pivot means. As a result, a comparatively small force is required for inserting and ejecting the cartridge. In the apparatus of the invention, the operating means on the carrier include two winding shafts which are inserted into corresponding winding cores of the cartridge when the carrier is moved along a straight path toward the cartridge. Consequently, the inserted cartridge can always remain in the same position supported on the supporting frame, so that space is saved, compared with a cartridge which has to be lowered to an operative position. It is therefore possible to arrange all manually operated keys or buttons adjacent each other under the insertion slot of the cartridge, where they can be easily viewed, particularly when built into the dashboard of an automobile.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENT

Figure 1:
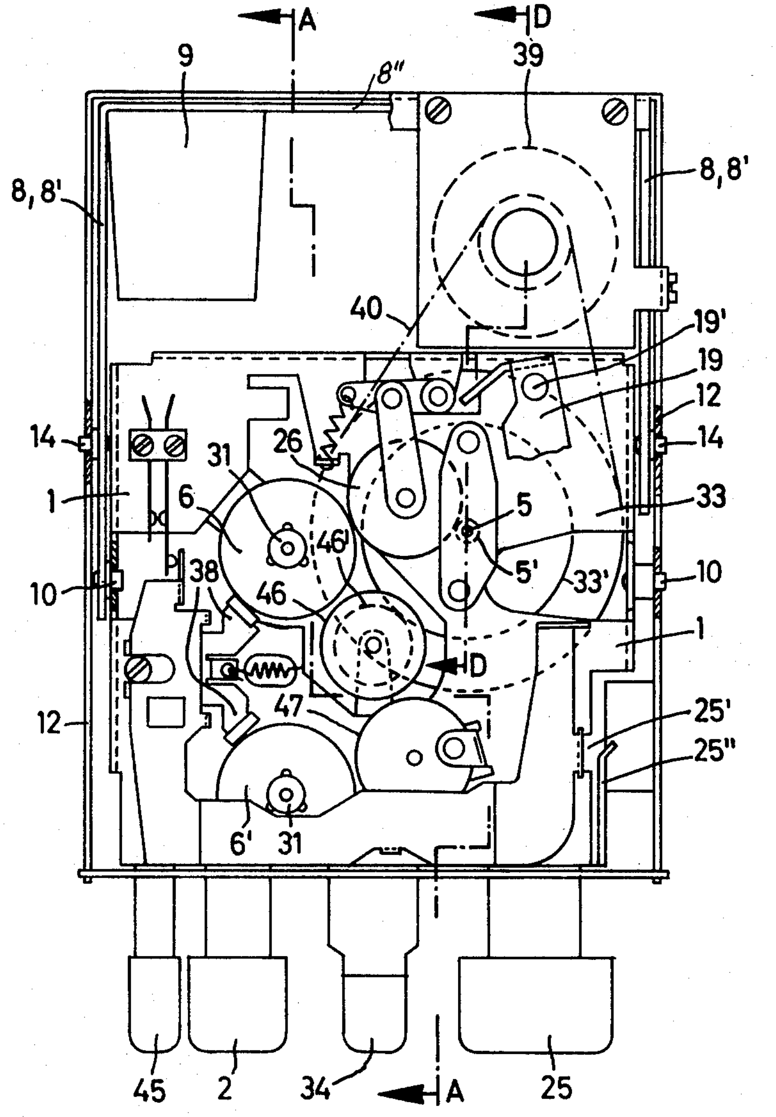
FIG. 1 is a plan view of a tape recorder according to the invention with the cartridge support and cartridge omitted.

As shown in the drawing, and particularly in FIG. 1, the operating means for a cartridge 27, including a flywheel 33 with the drive shaft 5, slip clutches 6, 6' for winding and unwinding, brakes 38, drive wheels 26, and so forth, are mounted on a carrier 1 which is mounted in the supporting frame 12 for rectilinear movement.

Figure 3:
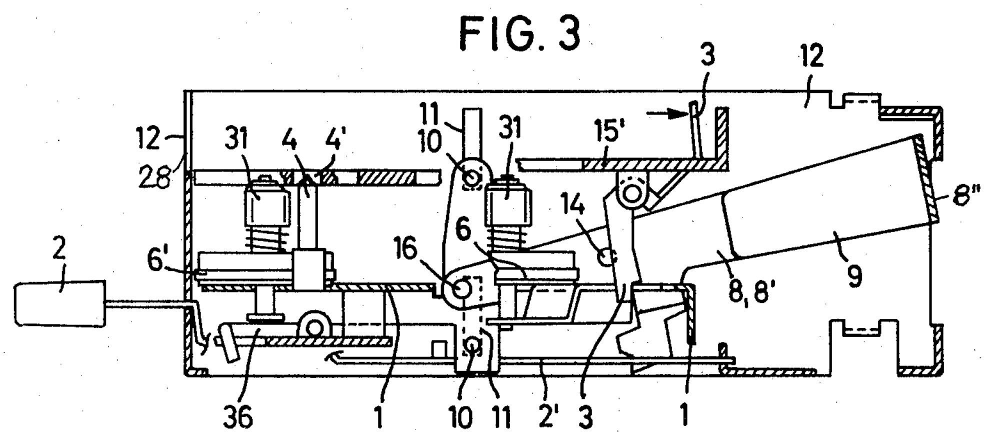
FIG. 3 is a sectional view taken on line A—A in FIG. 1, and illustrating the carrier and counterbalancing means in an inoperative normal position of rest.
Figure 4:
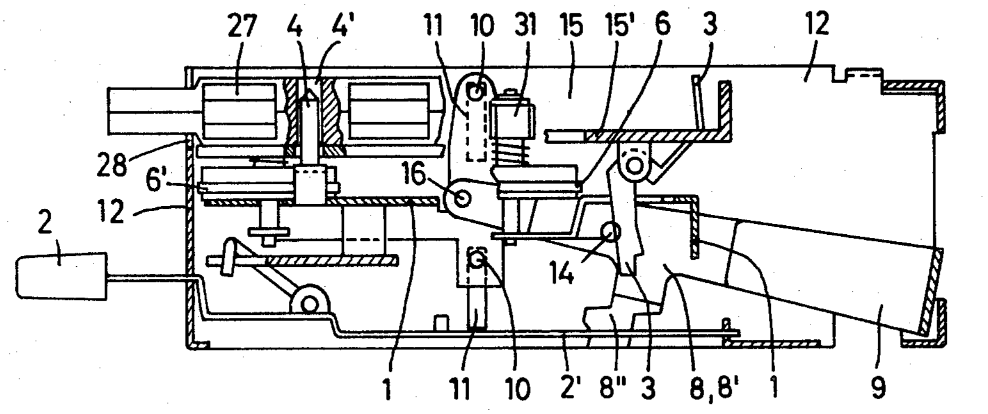
FIG. 4 is a sectional view taken on line B—B in FIG. 2, and illustrating the carrier and the counterbalancing lever means in an operative position.
Figure 5:
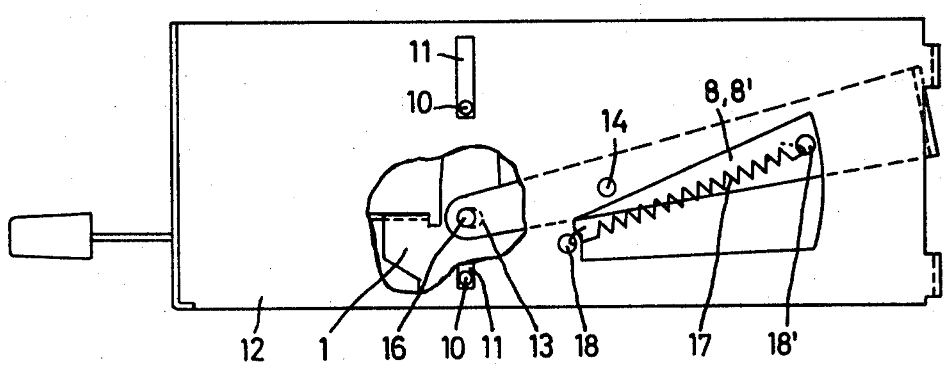
FIG. 5 is a side view of the supporting frame, illustrating the counterbalancing lever means in the normal inoperative position.
Figure 6:
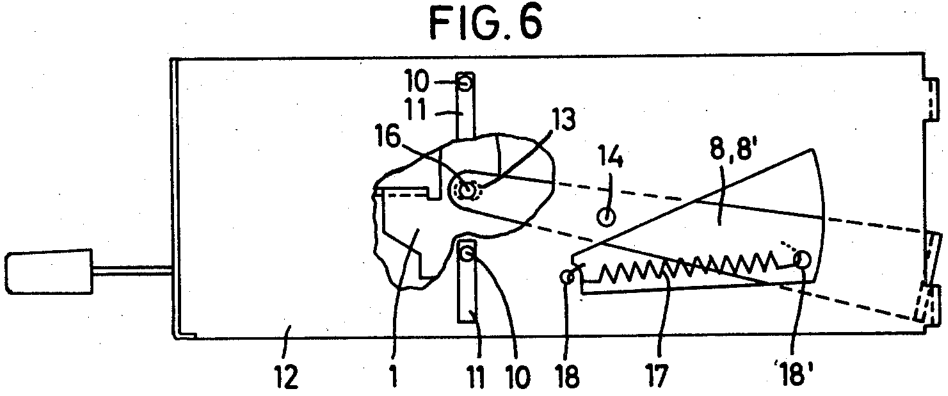
FIG. 6 is a side view corresponding to FIG. 5, but illustrating the counterbalancing lever means and the carrier in an operative position.

As is seen in FIGS. 1, 3 and 4, the carrier 1 has on opposite sides two pairs of guide pins 10 which are respectively guided in vertical guide slots 11 in two side walls of the supporting frame 12, so that carrier 1 is guided for rectilinear vertical movement between a lower inoperative position shown in FIG. 3 and FIG. 5, and higher operative position shown in FIGS. 4 and 6.

Double-armed lever means 8 are provided, and include two levers 8' on opposite sides of the apparatus, and a connecting yoke 8'' carrying a weight 9. The lever arms 8' are mounted on the supporting frame walls 12 by two pivot means 14 and have on the free ends, connecting pins 16 respectively located in slots 13 of the carrier 1, see FIG. 6, so that connecting pins 16 can move along short circular paths about pivots 14 while the slots 13 move with carrier 1 along a straight vertical path provided by the guide means 10 and 11 in the center of gravity of carrier 1.

The weight means 9 acts on a longer effective lever arm in relation to pivot means 14 than the carrier and operating means connected at 16 with the lever means 8, so that weight 9 can be lighter than the combined weight of the carrier 1 with the operating means. Weight 9 is selected to obtain an equilibrium so that the carrier means 1 would remain in any displaced position without the provision of a pair of springs 17, respectively connecting lever arms 8' with attaching holes 18 in the respective supporting frame wall 12, as best seen in FIGS. 5 and 6.

Figure 2:
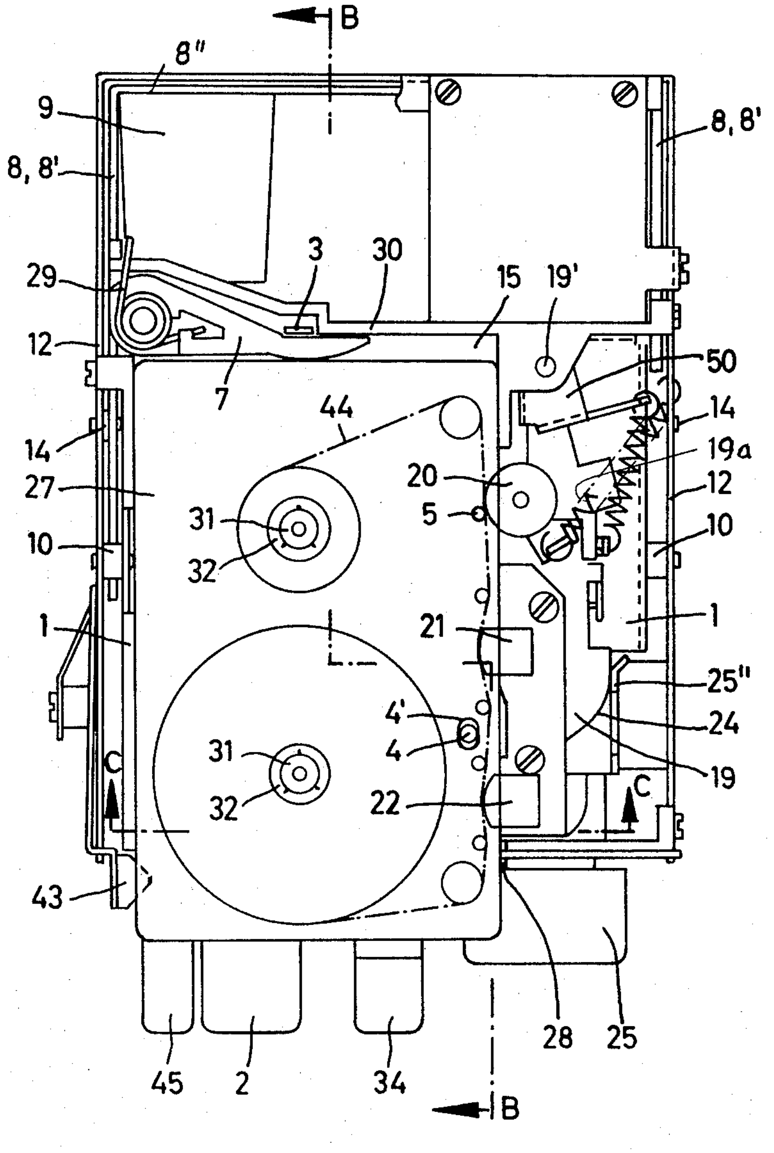
FIG. 2 is a plan view of the apparatus including the cartridge support, an inserted cartridge, schematically illustrated in an open condition, a rubber pressure roller, and transducer heads.
Figure 9:
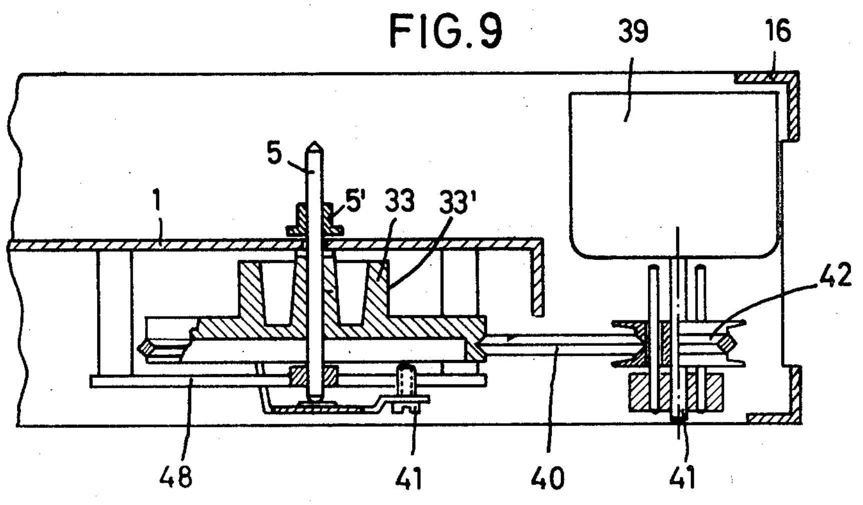
FIG. 9 is a fragmentary sectional view taken on line D—D in FIG. 1, and illustrating on a larger scale, a transmission between a motor and the drive shaft.

Due to the counterbalancing of the weight of the carrier 1 and the operating means with the weight 9, the operating means are not influenced in any manner by the position of the carrier, since the heavy carrier 1 and the flywheel 33 of drive shaft 5, see FIGS. 1, 2 and 9, two slip clutches 6, 6' for the winding wheels, and the associated brakes 38, and gear 26 are completely balanced in a position of equilibrium. This advantage cannot be obtained by springs, because springs increase in an undesired manner the manual force required for shifting the carrier 1 with the operating means, so that for every operational condition, a spring with a different spring force would be required. Due to the counterbalancing of the weight of the carrier 1 with the operating means 33, 5, 6, 6', 38, 26, it is not necessary to resiliently brace carrier 1 against the cartridge support 15' of the cartridge chamber 15, shown in FIG. 7.

As explained above, by the selection of the effective lever arms, a counterweight 9 can be used which is substantially lighter than the weight of carrier 1 with the operating means, and the weight of the counterweight 9 may be less than half the weight of carrier 1. This is advantageous from the point of view of reducing the total weight of the apparatus as is desirable for portable tape recorders.

As shown in FIGS. 5 and 6, between the lever arms 8', and the supporting frame walls 12, two spring means 17 are provided, only one of which is visible in FIGS. 5 and 6. Springs 17 serve the purpose of overcoming friction of lever means 8 and guide means 10, 11, so that carrier 1 is slightly pretensioned toward an inserted cartridge 27.

The attaching holes 18 in the supporting frame walls 12, and the attaching holes 18' in the lever arms 8', are positioned in such a manner that, although springs 17 are only slightly pretensioned, the carrier 1 is urged at a maximal pretension force against the wall of the space 15 for the cartridge 27, while during the lowering of the carrier 1, only small forces have to be supplied by the control key 2 which performs two functions, namely "-stop" and "eject".

Control key 2 starts an operation when actuated the first time, and causes ejection of the cartridge 27 when operated a second time.

A double function control key of this type is not an object of the invention, and is disclosed in detail in the German Pat. No. 1,228,078.

As shown in FIG. 2, the cartridge 27 has two winding cores 32 and is of rectangular shape. Cartridge 27 is inserted through a slot 28 in the front wall of the supporting frame 12, as best seen in FIGS. 2 and 3. The inserted cartridge is supported on parts of the supporting frame above the carrier 1 and the operating means thereon. When cartridge 27 is fully inserted, the inner end engages an ejector lever 7 which is tensioned by torsion spring 29, as shown in FIG. 2. Shortly before the ejector lever 7 is pushed by the cartridge to a position abutting the stop portion 30 of the supporting frame 12, ejector lever 7 engages and displaces a locking member 3, best seen in FIGS. 2, 3 and 4 so that the same is shifted from the locking position shown in FIG. 3 to the releasing position shown in FIG. 4 permitting movement of the carrier 1 to the higher operative position in which pin 4 is inserted into the bore 4' of the cartridge 27, and the operating shafts 31 are located in the winding cores 32 of the cartridge 27.

Since spring 29 of ejector lever 7 urges the cartridge 27 to move out of the slot 28, stop pin 4 is required for preventing ejection of cartridge 27 sliding on cartridge support 15', as best seen in FIG. 4. In this manner, insertion of the cartridge permits movement of the carrier 1 with the operating means, for example the winding shaft portions 31 which are inserted into the winding cores 32 of cartridge 27, and a first operational connection between cartridge 27 and the operating means on carrier 1 in supporting frame 12 is established.

A support lever 19 is mounted on the supporting frame 12 for angular movement about a pivot 19', and carries the transducer head 21 for recording and playback, and the erasing head 22. A pressure roller lever 50 is also mounted for angular movement about pivot 19'.

Figure 8:
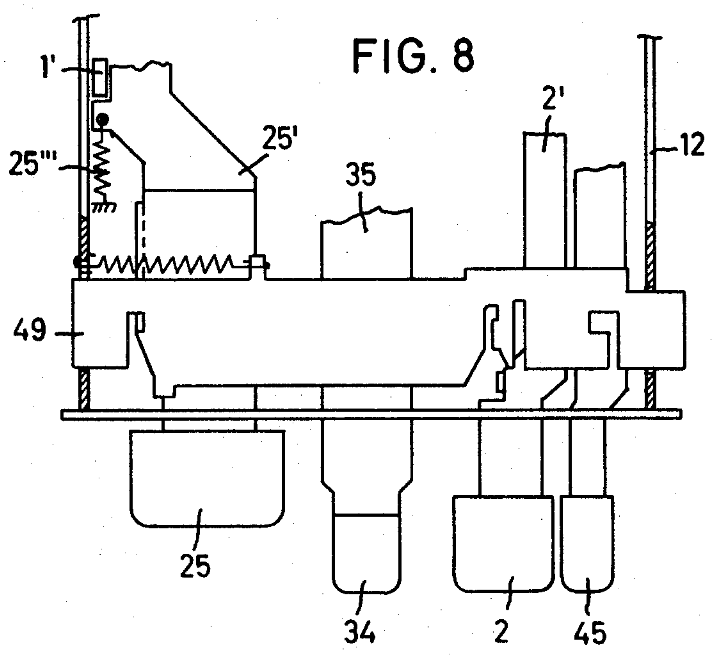
FIG. 8 is a fragmentary horizontal sectional view illustrating operating keys together with a locking bar for the same.

When cartridge 27 has been inserted, and carrier 1 has been moved to its operative position with the operating means thereon, the locking projection 1' of carrier 1 moves out of the position shown in FIG. 8, and releases the stem 25' of the start key 25 which is biassed by a spring 25''', as shown in FIG. 8.

When start key 25 is now depressed, a follower portion 25'', see FIG. 1, slides along a camming portion 24 of support lever 19, as shown in FIG. 2, and turns support lever 19 toward the cartridge 27, together with the transducer heads 21 and 22. The camming portion 24 has a continuously varying gradient so that the transmission ratio between follower portion 25'' and camming portion 24 varies in such a manner that the force required for operating start key 25 remains the same over the entire distance of movement of stop key 25, irrespective of the increasing resistance of the return spring 25''', see FIG. 8, and of spring 19a which biasses support lever 19. The placing of the transducer heads 21, 22 in the operative position shown in FIG. 2 constitutes a second operational connection between cartridge 27 and the tap recorder including supporting frame 12.

Figure 7:
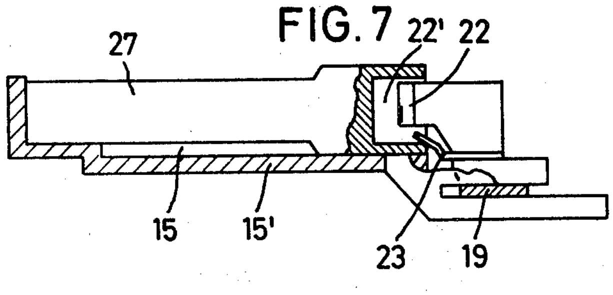
FIG. 7 is a fragmentary sectional view taken on line C—C in FIG. 2.

Under erasing head 22, a resilient locking means 23 in the form of a bent leaf spring is provided which resiliently engages a wall of an opening 22' provided in cartridge 27 when the eraser head 22 is in the correct operative position. The slanted end of the resilient locking means 23 presses the cartridge 27 against its support 15', as shown in FIG. 7.

As shown in FIG. 9, an electric motor 39 is mounted on the supporting frame 12 on the rear wall 16, and has a motor shaft 41 on which a pulley 42 is mounted for axial movement, while connected with motor shaft 41 for rotation. A flywheel 33 has a pulley portion connected by a resilient belt 40 with pulley 42. Flywheel 32 may move in axial direction with the drive shaft 5, and during such movement, pulley 42 moves axially along motor shaft 41. In this manner, a stretching of belt 40 in different axial positions of the two pulleys is prevented. For perfect operation, it is necessary to provide some axial play of drive shaft 5 with flywheel 33, which can be adjusted by an adjusting screw 41 of a resilient support 48 on which one end of drive shaft 5 rests. A friction wheel portion 33' see also FIG. 1, cooperates with portion 46' of a friction wheel 46 controlled by key 34. The control keys not only obtain the shifting of switches, not shown, to establish the required electric circuits, but also mechanical connections, for example, key 34 obtains the friction connection for rapid rewinding, or rapid forward winding by operative connection between the friction wheel 33' on flywheel 33 and friction wheel means 46, 46' which can be shifted by key 34 between two positions for transmitting opposite rotary motion to shafts 31.

Normal forward movement of the tape during recording playback, is effected through the friction roller 5' on drive shaft 5, see FIGS. 1 and 9; and the intermediate wheel 26 which drives the take-up clutch 6.

FIG. 8 shows start key 25, key 34 for rapid advance and rewinding, which can be shifted left and right, the double function control key 2 for stopping and ejection, and the recording key 45. A locking bar is slidable across the stems of the keys, and is loaded by spring 49a. Locking bar 49 prevents simultaneous operation of certain keys.

It will be understood that each of the elements described above, or two or more together, may also find a useful application in other types of tape recorders differing from the type described above.

While the invention has been illustrated and described as embodied in an operating apparatus for a cartridge tape recorder in which the carrier of the operating means is counterbalanced by a weight, it is not intended to be limited to the details shown, since various modifications and structural changes may be made without departing in any way from the spirit of the present invention.

Without further analysis the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. Operating apparatus for a cartridge tape recorder comprising, in combination, a supporting frame for a cartridge with a tape; a carrier means; mounting means mounting said carrier means on said supporting frame for movement in one direction between a normal inoperative position and an operative position; operating means for said tape mounted on said carrier means for movement with the same; and counterbalancing means mounted on said supporting frame and having one end connected with said carrier means for movement therewith, and including weight means on the other end thereof selected to substantially counterbalance the weight of said carrier means and of said operating means thereon.

2. Apparatus as claimed in claim 1 wherein said counterbalancing means include lever means having one end connected with said carrier means and an other end supporting said weight means, and pivot means between said ends for supporting said lever means on said supporting frame; and wherein said mounting means mount said carrier means on said supporting frame for rectilinear movement in said one direction between said positions.

3. Apparatus as claimed in claim 2 wherein the cartridge includes two winding cores for winding the tape; wherein said operating means include two operating shafts; wherein said mounting means include straight guide slots extending in said one direction, and guide pins located in said guide slots; and wherein during movement of said carrier means in said one direction between said normal and operative positions, said operating shafts move into and out of said winding cores of a cartridge on said supporting frame.

4. Apparatus as claimed in claim 2 wherein said supporting frame includes two walls between which said carrier means and said lever means are located; wherein said lever means includes two levers supported on said walls, respectively, by said pivot means, and a yoke connecting said levers at said other end of said lever means; and wherein said weight means is mounted on said yoke.

5. Apparatus as claimed in claim 2 wherein said pivot means is spaced from said one end and from said carrier means a lesser distance than from said other end and said weight means so that said weight means is lighter than said carrier means and operating means.

6. Apparatus as claimed in claim 2 and including spring means for connecting said lever means with said supporting frame, and secured to said lever means between said other end and said pivot means for urging said carrier means with said operating means at least to said operative position.

7. Apparatus as claimed in claim 6 wherein the effective lever arm of said spring means in relation to said pivot means is greater in said operative position than in said normal inoperative position so that said carrier means is most biassed in said operative position.

8. Apparatus as claimed in claim 6 including a spring loaded ejector lever movably mounted on said supporting frame and being biassed by the cartridge on said supporting frame; and a stop pin mounted on said carrier means and engaging the cartridge in said operative position for locking said cartridge against ejection until said carrier means is moved to said normal inoperative position.

9. Apparatus as claimed in claim 2 comprising a support member mounted on said supporting frame for movement between an inactive position and an active position; transducer means mounted on said support member and cooperating in said active position with the tape in said cartridge; and a resilient locking means secured to said support member and engaging the cartridge in said active position for locking the same.

10. Apparatus as claimed in claim 2 comprising a spring loaded support lever mounted on said supporting frame for movement between an inactive position and an active position; transducer means mounted on said support lever and cooperating with the tape in the cartridge in said active position, said support lever having a camming portion; and a spring biassed starting key mounted on said supporting frame and engaging said camming portion of said support lever, said camming portion having a shape selected to maintain a constant force on said starting key.

11. Apparatus as claimed in claim 2 comprising a drive shaft mounted on said carrier means for driving said operating means; a motor mounted on said supporting frame and having a motor shaft; a transmission connecting said motor shaft with said drive shaft and including a transmission member mounted on said motor shaft for axial movement and for rotation with the same so that said transmission member moves along said motor shaft when said carrier means moves between said positions with said drive shaft.

12. Apparatus as claimed in claim 11 comprising resilient adjusting means for adjusting the axial position of said drive shaft.

* * * * *